United States Patent
Minden (12)

(10) Patent No.: US 6,400,871 B1
(45) Date of Patent: Jun. 4, 2002

(54) PHASE CONTROL MECHANISM FOR COHERENT FIBER AMPLIFIER ARRAYS

(75) Inventor: Monica Minden, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/574,282

(22) Filed: May 19, 2000

(51) Int. Cl.$^7$ .................................................. G02B 6/26
(52) U.S. Cl. .............................. 385/39; 385/33; 385/31; 372/6
(58) Field of Search .............................. 385/31–33, 39; 372/6; 359/341.1

(56) References Cited

U.S. PATENT DOCUMENTS 5,233,673 A * 8/1993 Vali et al. ..................... 385/14
6,233,085 B1 * 5/2001 Johnson ..................... 356/5.09

* cited by examiner

*Primary Examiner*—Cassandra Spyrou
*Assistant Examiner*—Fayez Assaf
(74) *Attorney, Agent, or Firm*—Tope-McKay & Associates

(57) ABSTRACT

A phase control system configured for application with coherent fiber amplifier arrays. The invention advantageously utilizes existing fiber amplifiers to modulate array elements material properties of the fiber amplifier arrays; specifically, the arrays may be phased up or steered via modulation of their pump lasers. There are both thermal and index of refraction changes in the fiber when the pump light is absorbed. This invention specifically addresses using the pump light already present in fiber amplifiers to effect desired phase control, and to enable arrays of fibers to be coherently phased and steered via amplifier pumps additionally the degree of phasing may be adjusted using adaptive optic feedback techniques.

38 Claims, 7 Drawing Sheets

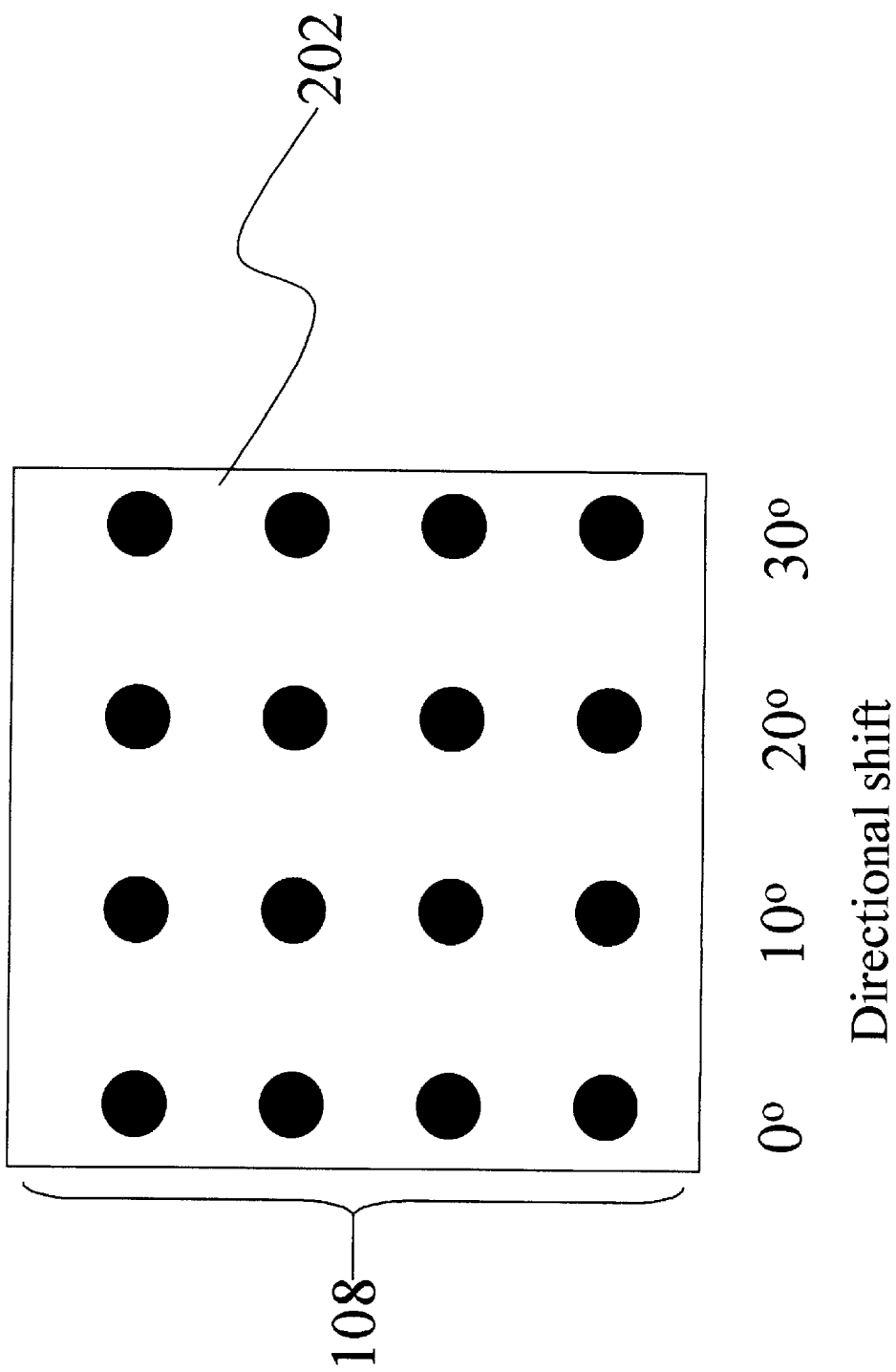

PHASE CONTROL MECHANISM FOR COHERENT FIBER AMPLIFIER ARRAYS

TECHNICAL FIELD

The present invention relates to a method and apparatus for manipulating and steering of laser beams from fiber-optic arrays. More specifically, the present invention provides a method and apparatus that controls the phase of the individual laser beams by controlling the pump power of the fiber amplifiers associated with each beam.

BACKGROUND OF THE INVENTION

The ability to steer beams emerging from fiber optic arrays has become important in a variety of fields, including communications and certain tracking and targeting technologies. New applications for fiber optics in these and related fields frequently require high phase coherence and directional accuracy. Presently, the methods used for steering fiber optic beams require additional mechanical and/or optical elements over and above the fiber laser system itself. These additional elements tend to be prohibitively expensive. Mechanical systems in particular, which utilize adaptive reflectors and/or refractors, tend to be difficult to construct and are limited in function by weight and inertia restrictions.

Several approaches have been proposed for overcoming the limits of the mechanically based beam steering systems, including phase conjugation, phase control via piezoelectric drivers, and phase control via electro-optics devices. One such approach for a fiber optic array uses optically phased arrays employing a large number of light emitters and optical phase delays between adjacent emitters to steer and focus an optical beam generated from the contributions of all the light emitters. Optical waveguides can be used to produce the phase delays, and the needed phase delays can thus be effected by piezoelectric or electro-optic effects in the waveguides. However, as noted above, this approach requires the inclusion of the necessary piezoelectric or electro-optic components, which drives up costs and complexity of fabrication of the array. Additional complexity and significant insertion loss also result because the light must be directed out of the fiber and into the waveguides, and then back into either the fibers or collimated for free space propagation.

Other approaches to beam steering involve the use of phase-active liquid crystals. Such systems confine the liquid crystals between optical elements and utilize the effects of electrical fields on the crystals to create a variety of optical components. By varying the electric field, the optical properties of the component can be modified. However, modification of these devices' optical properties, particularly in more than one dimension, requires complex adjustments the electrical field. Presently, liquid crystals are also limited in speed of response or phase excursion. Furthermore, as in the previous approaches, the complexity and cost of incorporating liquid crystal elements into a fiber array system are significantly higher than the present invention, which does not require any additional optical components.

SUMMARY OF THE INVENTION

The present invention provides a method and apparatus for effectively controlling the phase of an array of amplifying fibers that is low cost, simple, and does not require additional optical mechanical and optical elements beyond the laser system itself. This invention takes advantage of the ability of electromagnetic radiation such as provided by amplifier pumps to create changes in fiber properties such as temperature, which in turn can create phase shifts in the emitted light from the fibers without additional optical components.

In its preferred embodiment, the present invention provides a fiber amplifier array wherein a coherent source of radiation is provided to a plurality of fibers, and each of the amplified fibers has an independent source of pump light. The pump light can be modulated to introduce phase shifts in the light emitted from the fibers. The resulting output can then be provided back to the individual pumping sources in a feedback loop to permit control of the phasing and thus allow steering of the output from the entire array.

BRIEF DESCRIPTION OF THE DRAWINGS

FIG. 2b depicts an end view of a 4 by 4 fiber amplifier array; wherein the array is phased and the accompanying directional shift is indicated by the numbers stating the phase shift in degrees;

DETAILED DESCRIPTION OF THE PREFERRED EMBODIMENTS

The present invention provides a method and an apparatus for controlling the phase on fiber arrays. While the invention is described in terms of its application in connection with amplified coherent beam phased arrays the invention may be tailored to a variety of other applications. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Phased arrays exhibit desirable properties for many communication and laser radar systems. A primary advantage of the phased array is that it requires substantially no mechanical motion for beam steering. This can allow for very rapid beam steering, a high level of dependability, and consistent performance. Phased arrays additionally provide an excellent means of providing relatively coherent radiation to a targeted point, allowing the scaling of total power and enhancing brightness.

The phased-array system of the present invention provides a plurality of meaningful advantages over conventional mechanically steered mirrors or other optical elements. The most obvious advantage is the elimination of mechanical components, which are prone to failure. Because each element within the phased array may be independently controlled, multiple beams and beam directions may be formed, resulting in a more versatile system. Additionally the present invention provides a phased-array system having significantly lower costs, as compared to conventional mechanical systems or to other mechanisms of phase control.

Figure 1:
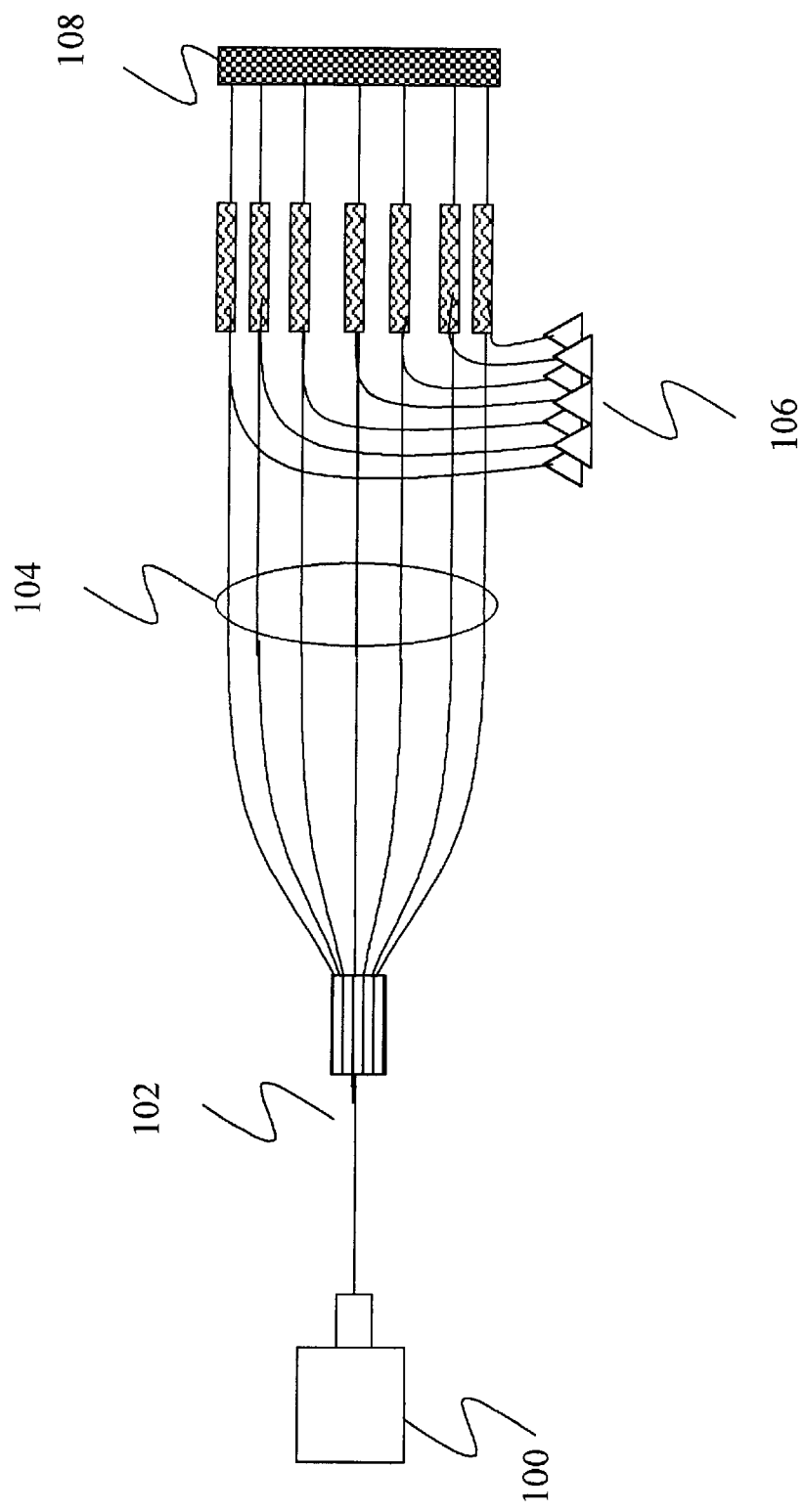
FIG. 1 depicts in two dimensions a fiber amplifier array according to the present invention wherein the array may be phase-controlled by controlling the power to the individual amplifier pumps coupled to each fiber.

One embodiment of the present invention is an apparatus, as depicted schematically in FIG. 1. This apparatus includes a light source 100, which may be a commercially available laser diode, or other source of coherent radiation, such as a 1064 nm high power diode laser, Nd:YAG laser, Nd:YVO$_4$ laser, or Nd:GdVO$_4$ laser. The radiation is conveyed to a fiber coupler 102, and the radiation is thereby provided to a plurality of fibers 104 that function as amplifiers. It is worth noting here that any plurality of coupling schemes could work for this system, the key element presented in this invention being that a single source of coherent radiation feeds a plurality of fiber amplifiers. In FIG. 1, the amplifying portion of the fibers is indicated by the shaded rectangles. In actuality, these are simply also fibers, but typically with a dopant in the core, spliced into the other fibers. Doped fibers which could be utilized in such a system include but are not limited to neodymium, erbium, and ytterbium-doped fibers. In the current embodiment, the fibers are each serviced by an amplifier pump 106; a Nd-doped fiber amplifier, for example, would typically be pumped by an 810 nm diode pump laser. The coupling scheme between the fibers and their corresponding amplifier pumps may take a variety of forms in the present invention.

Figure 2A:
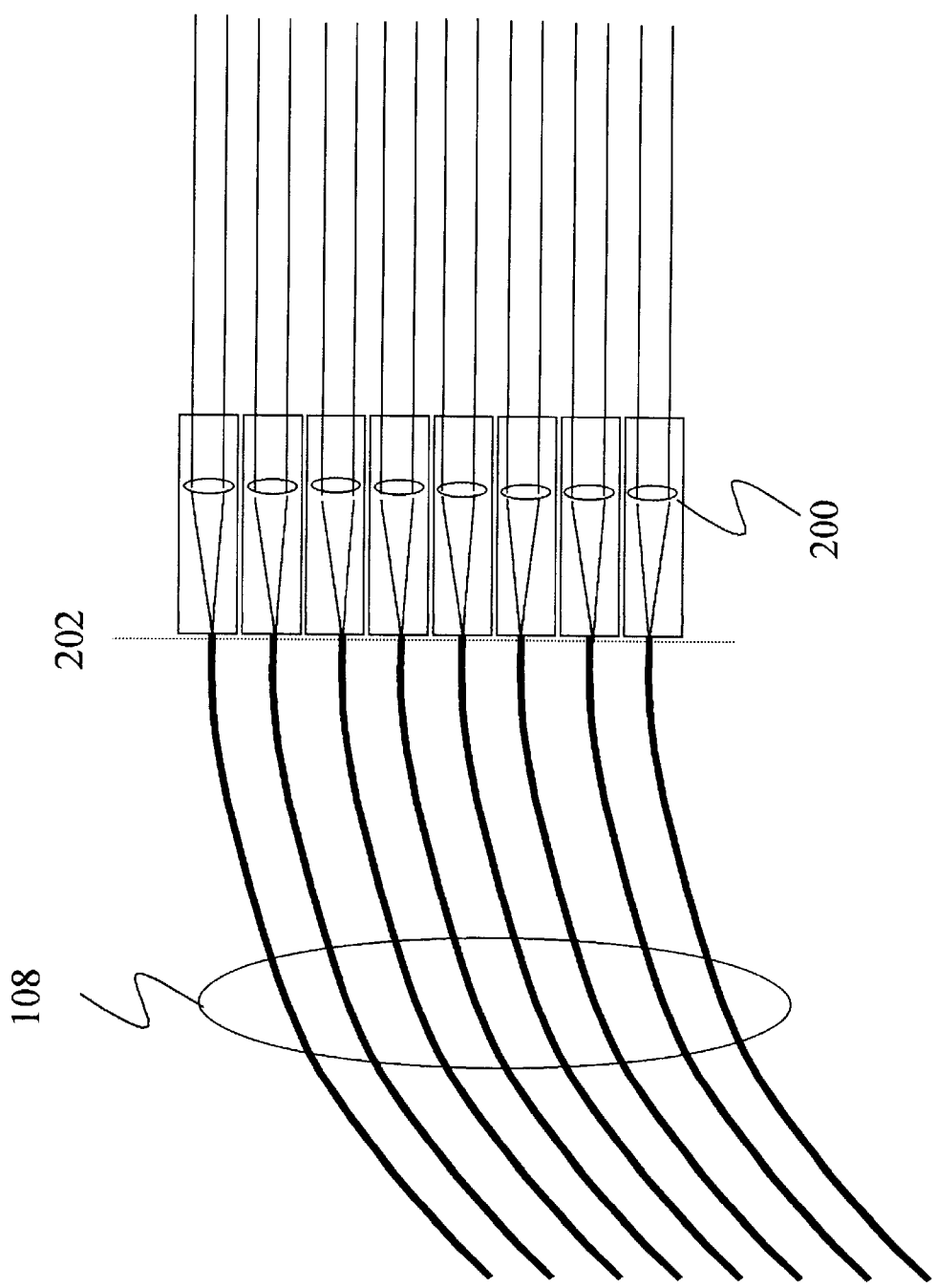
FIG. 2a depicts a side view of a fiber amplifier array as shown in FIG. 1, wherein the array is phased and the accompanying directional shift is illustrated by showing an approximate indication of the phase fronts emerging from the array.

The apparatus as shown in FIG. 1 is configured to control the plurality of amplifier pumps 106, and thus in turn control not only the amplitude but also the phase of the amplified coherent beams, wherein each beam originates from a common source 100 and wherein the aggregation of said fibers 104 comprise an array 108. Such an array 108 is illustrated, generally, in FIG. 2. Each of the amplified fibers 104 is terminated by a device, shown for illustration purposes as a simple lens 200, that collimates the output of each fiber into a beam substantially parallel to the other beams in the array. The array 108 as shown in FIG. 2a includes a front surface 202 wherein the aggregation of amplifying fibers terminate. The point where the fibers in the amplifying array terminate 202 can serve as an output source of phased radiation. Shown in FIG. 2b is an end view of a possible embodiment which again includes a front surface 202 wherein the aggregation of amplifying fibers terminate. Note that while the array shown in FIG. 2b is a 4 by 4 array, the present invention is intended to encompass any configuration of N by M fibers, such as a hexagonally arranged configuration.

An array built according to the present invention may have as its radiation source 100 an emitter having a flexible waveform that is created by a distributed Bragg reflector (DBR) diode laser used as a master oscillator. This laser-based radiation source can provide a plurality of output types, continuous wave, pulsed with sub nano-second bursts or longer pulses, chirped, temporally coded, wavelength-tuned, or passed through a high speed modulator, depending on the applications requirements. The fiber coupler 102 may be a 1XN fiber splitter, or other appropriate splitter, to coherently feed each of N fibers in the amplifier array. Thus, in combination with the fiber amplifiers, the fiber bundle approach could easily address the need for a multifunction laser source for laser communications, identification objects as friend or foe (IFF), laser designators, and many other applications.

Figure 3:
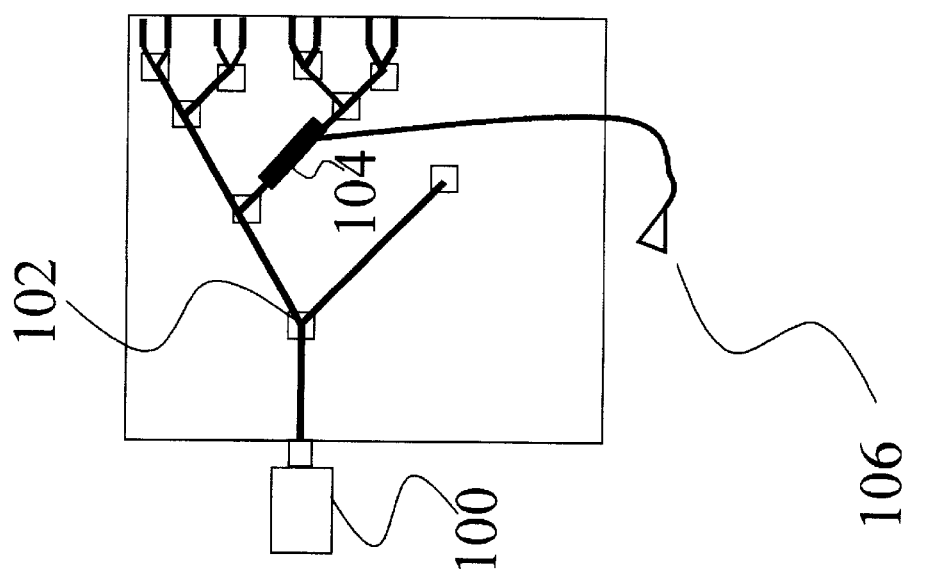
FIG. 3 depicts an embodiment of the present invention wherein a coherent light source is coupled via a fiber coupler to a plurality of fiber amplifiers that are then further split in any number of subsequent steps.

An alternate embodiment of the present invention is depicted in FIG. 3. As described for the previous embodiment, this embodiment provides a light source 100, which feeds into a fiber coupler 102. The fiber coupler then provides the radiation to a plurality of fibers 104. In the present embodiment, the fiber amplifiers are further split by appropriate fiber splitters 102 in one or more additional splitting steps to feed the coherent radiation from the light source into additional fibers 104. In the present embodiment, the fibers 104 are coupled independently to amplifier pumps 106, either before or after splitting steps, depending on the application and system limits.

Because the fiber array output is amplified from a single coherent source and cladding pumped fibers have single transverse modes, the entire array 108 can be phased into coherence for high-brightness power scaling and for beam steering. In the preferred embodiment of this invention, the degree of phasing of the array may be monitored and correspondingly adjusted using adaptive optic feedback techniques that are well known within the art.

Figure 4:
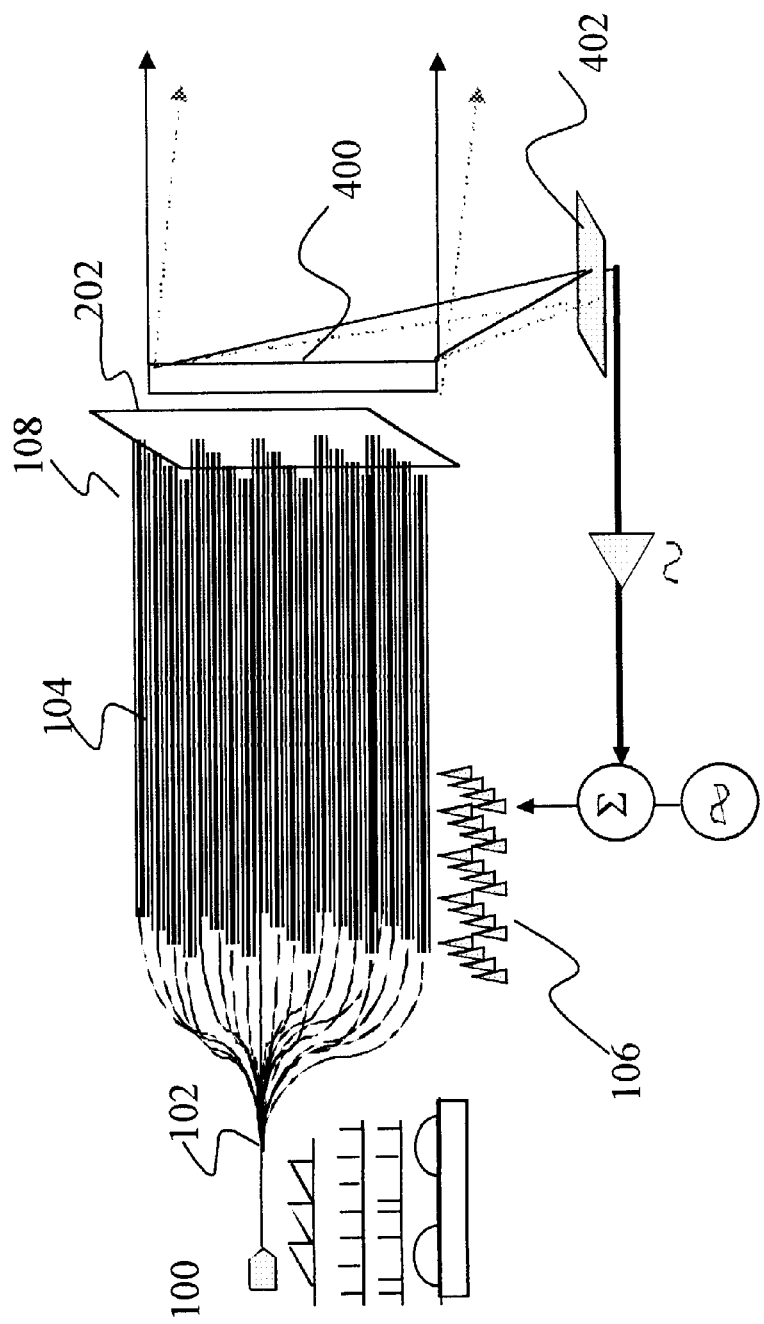
FIG. 4 depicts apparatus encompassing the present invention, wherein a coherent light source is coupled to a fiber amplifier array, which is phase-controlled by individually coupled amplifier pumps. In this depiction, a portion of the output of the array is conveyed back to the pump control electronics in an active feedback loop.

A depiction of the preferred embodiment of the present invention including optical feedback is provided in FIG. 4. The coherent light source 100 feeds into the fiber coupler 102, which subsequently provides the coherent radiation to all of the available fibers 104 that together will be combined to create an array 108. Each of the fibers is serviced by an amplifier pump 106, by which each amplified fiber in the array is not only pumped but also phase-controlled. In the present embodiment, the coherent light output is controlled by providing a low-efficiency whole-beam focus of the far field pattern using a holographic element 400 within the path of the output. The information derived from the far field pattern image is processed using simple dithering techniques to provide phase control and the correct drive power fed to the amplifier pumps 106. In this particular depiction, feedback is provided by directing the far field pattern to a movable detector or switched array 402 that then conveys the information back to properly control the amplifier pumps 106. Alternative approaches to providing feedback may include but are not limited to the feed-forward techniques of Hartmann, and the use of one or more shearing interferometers.

While the concept of phasing an entire array is not new in the art, the present invention provides a method whereby the pump light already present in fibers is utilized to effect a desired phase control, and to thereby enable arrays of fibers to be coherently phased and steered via control of the amplifier pumps. Phase changes in the light being guided by the fibers may be brought about by a plurality of factors, including changes in fiber temperature and changes in indices of refraction of the fibers, all of which occur when pump light is present in the fiber. Changes in the pump light, for example, produce changes in the temperature of the fiber core, which in turn produces changes in the phase of the guided light. Small changes in the amplitude of the pump and/or degree of amplification can produce significant changes in the phase. In the preferred embodiment, such phase changes are intentionally brought about by controlling the amount of pump light in an amplifying fiber. It will be appreciated by those understanding the art that such temperature and phase changes could induced by other means, such as introducing a wavelength of light into the core that is absorbed by the core, but is not necessarily a pump wavelength for an amplifying fiber.

The optical thickness of a fiber, and thus its ability to be phase-controlled, is primarily affected by changes both in refractive index and physical length as a function of temperature. Fiber temperature as a function of time is dependent on mounting and on the speed of changes in the pump power. For the preferred embodiment of the present invention, the degree of variation in the pump intensity required to obtain the necessary optical length variation for steering and the required speed of phase control have been estimated, both from modeling predictions and experimental data. The estimates presented herein focus on the contribution of refractive index changes to optical thickness.

Fiber response time to a change in absorbed pump radiation is given approximately by $d^2/D$, wherein d is the core diameter, and D is the thermal diffusivity. A value for D in the range of $8.46\ 10^{-7}\ m^2/s$ is reported by Davis et al, *J. Lightwave Tech* 16(6),6/98, p.1013. For a conventional fiber with 5 $\mu$m diameter core, for example, this relationship predicts a rapid response time from the fiber on the order of 30 $\mu$s or 33 kHz. For a $\tau$=30 $\mu$s response time, P=100 mW of absorbed pump power will provide approximately a half wavelength shift $[[\tau P/(\rho C_v d^2 \lambda)=0.5]$, where $\rho$ and $C_v$ are the density and the heat capacity respectively of the fiber] in the phase. Allowing for slow thermal buildup (0.2 second) in this fiber, the same shift is on the order of 5 mm, so that true-time delays required for synchronizing short pulses could be accommodated. The rapid response estimated for the present invention in fact surpasses the speed of response possible with conventional phasing devices such as piezoelectric transducers, which have typical response limits on the order of 5 kHz (200 $\mu$s).

Figure 5A:
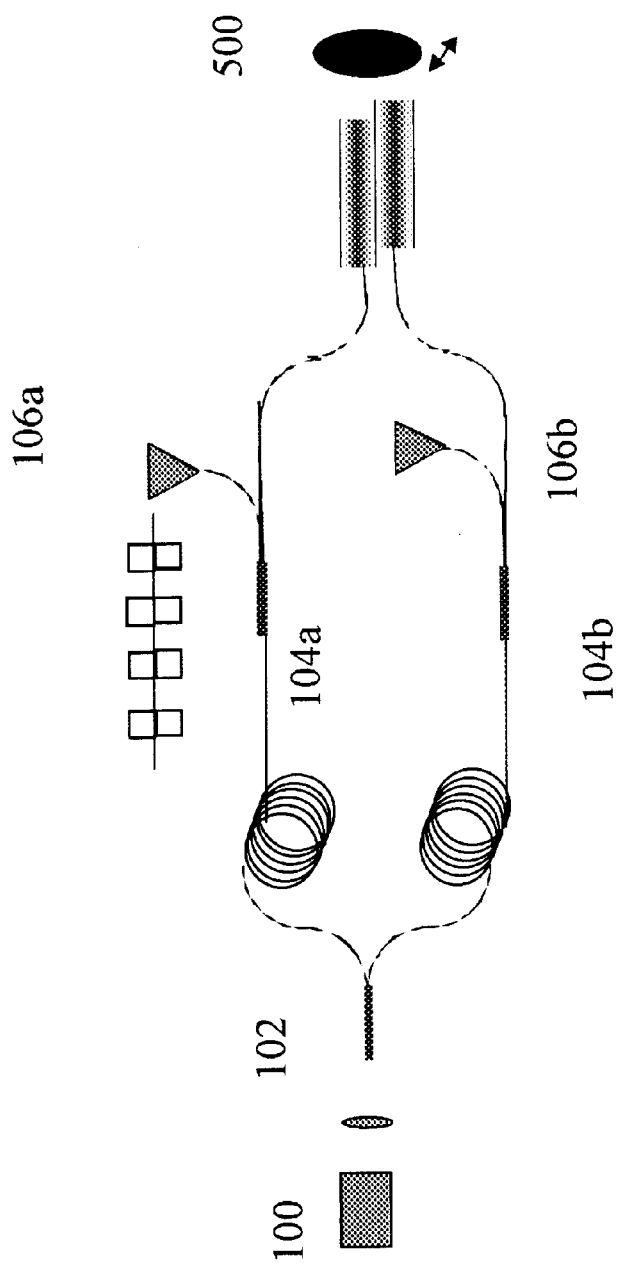
FIG. 5a depicts an apparatus according to the present invention, specifically an optical source divided into a simple two-fiber array wherein one fiber is subject to modulated amplification and the other is subject to un-modulated amplification.

In order to confirm that the fast response time predicted mathematically is in fact realizable, the concept of the present invention was demonstrated using simple interference between two neodymium fibers with 5 $\mu$m cores. The experimental setup is illustrated in FIG. 5a. According to the preferred embodiment, the source of coherent radiation 100, in this example a Nd:YAG laser, conveys said radiation to a fiber coupler 102. The coupler 102 conveys the coherent radiation from the source to a plurality of fiber amplifiers, in this case, a first fiber amplifier 104a and a second fiber amplifier 104b. In FIG. 5a, the radiation within the first fiber is amplified using a modulated, 810 nm diode pump laser 106a, while the second fiber is pumped with a 810 nm diode pump laser 106b kept at constant pump power. Modulating the pump power allowed observation of interference fringes 500 using a photodetector.

Figure 5B:
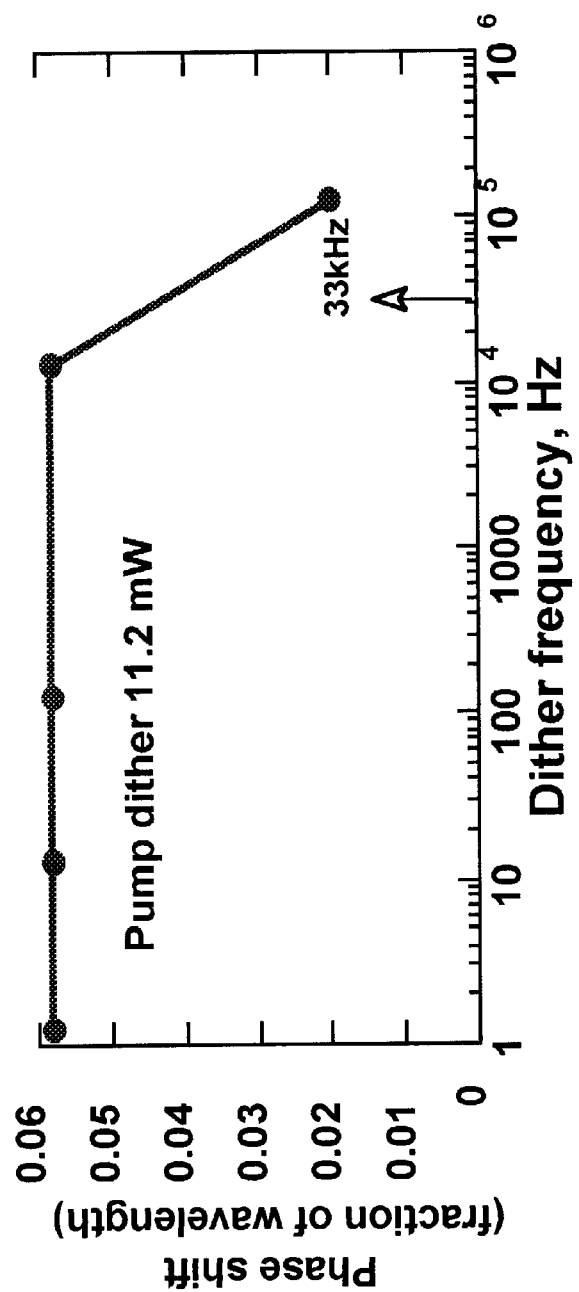
FIG. 5b depicts the phase-shift recorded for the apparatus in FIG. 5a utilizing modulated amplification of one fiber.

The net effect of thus pumping the fibers is depicted in FIG. 5b. For a pump modulation power of 11.2 mW, at modulation frequencies below 20 kHz, a shift of 0.056 wavelengths (0.056 $\lambda$) was observed in the phase of the radiation within the fiber amplifier pumped with the modulated amplifier 106a. The fiber amplifier pumped with the un-modulated amplifier 106b is not phase-shifted. In addition, at higher pump modulation frequencies, as shown in FIG. 5b, the magnitude of the phase shift decreases. These results agree closely with the theoretically predicted response time limit of 33 khz.

What is claimed is:

1. A phase control apparatus for a coherent fiber amplifier array comprising:
   i. a coherent source of electromagnetic radiation;
   ii. a first length of electromagnetic radiation conducting fiber having a first and a second end;
   iii. at least one fiber coupler configured to accept a single fiber input and provide a plurality of fiber outputs;
   iv. a plurality of secondary lengths of electromagnetic radiation-conducting fiber wherein each length has a first and a second end;
   v. a plurality of electromagnetic radiation-amplifying pumps configured to have modulated pump input;
   vi. a means for binding a plurality of fibers in an array without substantially encumbering electromagnetic radiation from the fiber outputs from said second ends of said plurality of secondary lengths of electromagnetic radiation-conducting fibers;
   vii. a plurality of micro lenses configured to condition an output from said second ends of said plurality secondary lengths of electromagnetic radiation conducting fibers; and a means for independently controlling the amplitude modulation of the pump radiation to control the phase of each amplifier fiber;

wherein,
   a. said coherent source of electromagnetic radiation provides an electromagnetic radiation input to said first end of said first length of electromagnetic radiation-conducting fiber; and
   b. said second end of said first length of electromagnetic radiation conducting fiber provides an input to said at least one fiber coupler configured to accept a single fiber input and provide a plurality of fiber outputs; wherein
   c. said fiber outputs are bound in an array, wherein said array is configured such that said plurality of fibers are in a substantially planar array and that the output from the fibers is substantially unencumbered; and wherein,
   d. before said plurality of second lengths of electromagnetic radiation-conduction fibers reach said array, said fibers are coupled to a plurality of electromagnetic radiation-amplifying pumps; and wherein,
   e. said output of said substantially unencumbered planar array of fibers is conditioned by a plurality of micro lenses; and a means is provided for controlling the modulated output of said electromagnetic radiation amplifying pumps.

2. The phase control apparatus for a coherent fiber amplifier array of claim 1 wherein the coherent source of radiation transmits substantially at 1064 nm.

3. The phase control apparatus for a coherent fiber amplifier array of claim 1 wherein the coherent source of radiation is a Nd:YAG laser.

4. The phase control apparatus for a coherent fiber amplifier array of claim 1 wherein the coherent source of radiation is a Nd:XVO$_4$ laser, and wherein X is selected from the group consisting of Ytterbium and Gadolinium.

5. The phase control apparatus for a coherent fiber amplifier array of claim 1 wherein said plurality of electromagnetic radiation-amplifying pumps receive information on the level of their pump input from a feedback loop configured to provide input from an intercepted portion of electromagnetic radiation emitted from said plurality of microlenses.

6. The phase control apparatus for a coherent fiber amplifier array of claim 5 wherein one or more shearing interferometers are utilized in said feedback loop.

7. The phase control apparatus for a coherent fiber amplifier array of claim 5 wherein said electromagnetic radiation is intercepted using a partially reflective window, wherein said intercepted radiation impinges on a surface configured to sense a plurality of data pertaining to the impinging radiation.

8. The phase control apparatus for a coherent fiber amplifier array of claim 5 wherein one of the factors that is sensed includes coherence.

9. The phase control apparatus for a coherent fiber amplifier array of claim 5 wherein one of the factors sensed includes position.

10. The phase control apparatus for a coherent fiber amplifier array of claim 1 wherein the plurality of electromagnetic radiation-amplifying pumps rely on high power diode lasers configured to induce thermal variations into said secondary fibers, wherein said thermal variations contribute to a phase shift in emitted electromagnetic radiation.

11. The phase control apparatus for a coherent fiber amplifier array of claim 1 wherein said plurality of second lengths of fiber are fibers doped with a dopant selected from the group consisting of neodymium, erbium, and ytterbium.

12. The phase control apparatus for a coherent fiber amplifier array of claim 1 wherein the plurality of second lengths of fiber are doped with neodymium and the plurality of electromagnetic radiation-amplifying pumps rely on 810 nm diode lasers.

13. The phase control apparatus for a coherent fiber amplifier array of claim 1 wherein the plurality of second lengths of fiber are doped with neodymium and the plurality of electromagnetic radiation-amplifying pumps rely on 810 nm diode Nd:YAG lasers.

14. The phase control apparatus for a coherent fiber amplifier array of claim 1 wherein the plurality of second lengths of fiber are doped with erbium and the plurality of electromagnetic radiation-amplifying pumps rely on 980 nm diode lasers.

15. The phase control apparatus for a coherent fiber amplifier array of claim 1 wherein the plurality of second lengths of fiber are doped with ytterbium and the plurality of electromagnetic radiation-amplifying pumps rely on 915 nm diode lasers.

16. The phase control apparatus for a coherent fiber amplifier array of claim 1 wherein:
   i. the at least one fiber coupler is a plurality of couplers; and
   ii. a first coupler of said plurality of couplers is provided with an input from said first length of fiber and provides N outputs to the plurality of second lengths of fiber; and
   iii. each outputted secondary fiber serves as an input to another fiber coupler which provides M outputs to another plurality of second lengths of fiber; and
   iv. step iii may be repeated T times; and
   v. where N, M, and T are integers.

17. The phase control apparatus for a coherent fiber amplifier array of claim 1 wherein one or more secondary sources other than said plurality of electromagnetic radiation-amplifying pumps provides electromagnetic radiation to one or more of the plurality of second lengths of fiber to create a phase shift in the radiation emitted from the fiber outputs.

18. The phase control apparatus for a coherent fiber amplifier array of claim 17 wherein one or more of the plurality of second lengths of fiber has a temperature and one or more of the secondary sources is configured to change the temperature of one or more of the plurality of second lengths of fiber to create a phase shift in the emitted radiation.

19. The phase control apparatus for a coherent fiber amplifier array of claim 17 wherein one or more of the plurality of second lengths of fiber has a refractive index and one or more of the secondary sources is configured to change the refractive index of one or more of the plurality of second lengths of fiber to create a phase shift in the emitted radiation.

20. A method for controlling the phase of a coherent fiber amplifier array comprising the following steps:
   i. providing a coherent source of electromagnetic radiation;
   ii. providing a first length of electromagnetic radiation-conducting fiber having a first and a second end;
   iii. providing at least one fiber coupler configured to accept a single fiber input and provide a plurality of fiber outputs;
   iv. providing a plurality of secondary lengths of electromagnetic radiation-conducting fiber wherein each length has a first and a second end;
   v. providing a plurality of electromagnetic radiation-amplifying pumps configured to provide modulated output;
   vi. providing a means for binding a plurality of second lengths of fiber in an array without substantially encumbering the electromagnetic radiation output from said second ends of said plurality of secondary providing lengths of electromagnetic radiation-conducting fibers;
   vii. providing a plurality of micro lenses configured to condition an output from said second ends of said plurality secondary lengths of electromagnetic radiation-conducting fibers; and
   viii. providing a means for independently controlling the amplitude modulation of the pump radiation to control the phase of each amplifier fiber;
   wherein
   a. said coherent source of electromagnetic radiation provides an electromagnetic radiation input to said first end of said first length of electromagnetic radiation-conducting fiber; and
   b. said second end of said first length of electromagnetic radiation conducting fiber provides an input to said at least one fiber coupler configured to accept a single fiber input and provide a plurality of fiber outputs; wherein
   c. said fiber outputs are bound in an array, wherein said array is configured such that said plurality of second lengths of fiber are in a substantially planar array and that the output from the fibers is substantially unencumbered; and wherein,
   d. before said plurality of electromagnetic radiation-conduction fibers reach said array, said fibers arc coupled to a plurality of electromagnetic radiation-amplifying pumps; and wherein,
   e. said output of said substantially unencumbered planar array of fibers is conditioned by a plurality of micro lenses; and a means is provided for controlling the modulated output of said electromagnetic radiation amplifying pumps.

21. The method for controlling the phase of a coherent fiber amplifier array of claim 20 wherein the coherent source of radiation transmits substantially at 1064 nm.

22. The method for controlling the phase of a coherent fiber amplifier array of claim 20 wherein coherent source of radiation is a Nd:YAG laser.

23. The method for controlling the phase of a coherent fiber amplifier array of claim 20 wherein the coherent source of radiation is a Nd:XVO$_4$ laser, wherein X is selected from the group consisting of Ytterbium and Gadolinium.

24. The method for controlling the phase of a coherent fiber amplifier array of claim 20 wherein said plurality of electromagnetic radiation-amplifying pumps receive input from a feedback loop configured to provide input from an intercepted portion of electromagnetic radiation emitted from said plurality of microlenses.

25. The phase control apparatus for a coherent fiber amplifier array of claim 24 wherein one or more shearing interferometers are utilized in said feedback loop.

26. The method for controlling the phase of a coherent fiber amplifier array of claim 24 wherein said electromagnetic radiation is intercepted using a partially reflective window, wherein said intercepted radiation impinges on a surface configured to sense a plurality of factors pertaining to the impinging radiation.

27. The method for controlling the phase of a coherent fiber amplifier array of claim 24 wherein one of the factors that is sensed includes coherence.

28. The method for controlling the phase of a coherent fiber amplifier array of claim 24 wherein one of the factors sensed includes position.

29. The method for controlling the phase of a coherent fiber amplifier array of claim 24 wherein the plurality of electromagnetic radiation-amplifying pumps rely on high power diode lasers configured to induce thermal variations into said secondary fibers, wherein said thermal variations contribute to a phase shift in emitted electromagnetic radiation.

30. The method for controlling the phase of a coherent fiber amplifier array of claim 20 wherein said plurality of second lengths of fiber are fibers doped with a dopant selected from the group consisting of neodymium, erbium, and ytterbium.

31. The method for controlling the phase of a coherent fiber amplifier array of claim 20 wherein the plurality of second lengths of fiber are doped with neodymium and the plurality of electromagnetic radiation-amplifying pumps rely on 810 nm diode lasers.

32. The method for controlling the phase of a coherent fiber amplifier array of claim 20 wherein the plurality of second lengths of fiber are doped with neodymium and the plurality of electromagnetic radiation-amplifying pumps rely on 810 nm diode Nd:YAG lasers.

33. The method for controlling the phase of a coherent fiber amplifier array of claim 20 wherein the plurality of second lengths of fiber are doped with erbium and the plurality of electromagnetic radiation-amplifying pumps rely on 980 nm diode lasers.

34. The method for controlling the phase of a coherent fiber amplifier array of claim 20 wherein the plurality of second lengths of fiber are doped with ytterbium and the plurality of electromagnetic radiation-amplifying pumps rely on 915 nm diode lasers.

35. The method for controlling the phase of a coherent fiber amplifier array of claim 10 wherein:
  i. the at least one fiber coupler is a plurality of couplers; and
  ii. a first coupler of said plurality of couplers is provided with an input from said first length of fiber and provides N outputs to the plurality of second lengths of fiber; and
  iii. each outputted secondary fiber serves as an input to another fiber coupler which provides M outputs to another plurality of second lengths of fiber; and
  iv. step iii may be repeated T times; and
  v. where N, M, and T are integers.

36. The method for controlling the phase of a coherent fiber amplifier array of claim 20 wherein one or more secondary sources other than said plurality of electromagnetic radiation-amplifying pumps provides electromagnetic radiation to one or more of the plurality of second lengths of fiber to create a phase shift in the radiation emitted from the fiber outputs.

37. The method for controlling the phase of a coherent fiber amplifier array of claim 36 wherein one or more of the secondary sources is configured to change the temperature of one or more of the plurality of second lengths of fiber to create a phase shift in the emitted radiation.

38. The method for controlling the phase of a coherent fiber amplifier array of claim 36 wherein one or more of the secondary sources is configured to change the refractive index of one or more of the plurality of second lengths of fiber to create a phase shift in the emitted radiation.

* * * * *